United States Patent [19]

Osuna-Diaz

[11] Patent Number: 4,652,230
[45] Date of Patent: Mar. 24, 1987

[54] INJECTION MOLDING NOZZLE

[76] Inventor: J. M. Osuna-Diaz, 2357 Avon Industrial Dr., Auburn Hgts., Mich. 48057

[21] Appl. No.: 730,583

[22] Filed: May 6, 1985

[51] Int. Cl.⁴ .......................................... B29C 45/20
[52] U.S. Cl. ................................ 425/549; 425/570; 264/328.15; 264/328.11
[58] Field of Search ........................... 425/549, 570; 264/328.15, 328.11

[56] References Cited

U.S. PATENT DOCUMENTS

| | | | |
|---|---|---|---|
| 3,010,155 | 11/1961 | Gilmore | 264/328.15 |
| 3,103,039 | 9/1963 | Robinson | 425/549 |
| 3,800,027 | 3/1974 | Tsutsumi | 425/549 |
| 4,004,871 | 1/1977 | Hardy | 425/549 |
| 4,279,582 | 2/1981 | Osuna-Diaz | 425/549 |
| 4,279,588 | 7/1981 | Gellert | 425/549 |
| 4,422,841 | 12/1983 | Alfonsi et al. | 425/549 |
| 4,450,999 | 5/1984 | Gellert | 425/549 |

FOREIGN PATENT DOCUMENTS

| | | | |
|---|---|---|---|
| 2113482 | 9/1972 | Fed. Rep. of Germany | 425/568 |
| 58-39428 | 3/1983 | Japan | 425/549 |
| 2109296 | 6/1983 | United Kingdom | 425/549 |

Primary Examiner—Tim Miles
Attorney, Agent, or Firm—John R. Benefiel

[57] ABSTRACT

An injection mold nozzle is disclosed of the "bodyless" type, with a tip insert surrounding a needle in a central flow passage, each extending forwardly to protrude from the main body of the nozzle into a sprue cavity adjacent the mold cavity and communicating with an injection port. The tip insert conducts heat into the needle and material in the sprue cavity to maintain temperature of the material while eliminating the impression on the part of a full body nozzle design. The nozzle is also provided with a stepped diameter heater cover forming a shoulder to provide a locating feature which may be shifted by machining to adapt a single nozzle configuration to mold plate thicknesses.

4 Claims, 5 Drawing Figures

INJECTION MOLDING NOZZLE

BACKGROUND OF THE INVENTION

1. Field of the invention.

This invention concerns injection molding nozzles and more particularly heated injection molding nozzles of the type adapted to maintain the injection molding material at a high temperature as it flows through the flow passages in the nozzle and mold.

2. Description of prior art

Injection molding nozzles of the type including a surrounding heating coil, have taken essentially two different forms. The first is the so called "full body" form, in which a tip insert protrudes forwardly from the injection nozzle and surrounds a centrally located heat transfer needle in the injection flow passage. The forward end of the insert tip is shaped with a reduced diameter end within which the flow passage converges into an injection port. The reduced diameter end is inserted into a bore in a mold plate defining in part the mold cavity, with the bore extending directly into the mold cavity. The needle and insert tip conduct heat from the heater coil, such as to maintain the molding material at a high temperature molten condition in the passages adjacent the injection port.

The presence of the reduced diameter end on the insert tip in the mold cavity leaves a slight impression on the molded part, which sometimes is objectionable.

Accordingly, "bodyless" injection nozzles have been developed in which a sprue cavity is provided in the mold plate adjacent an injection port also formed in the mold plate. The "bodyless" injection nozzle is positioned adjacent the injection cavity with a needle protruding forwardly into the sprue cavity in order to maintain the molding material in a molten, easily injectable condition. This approach eliminates the impression left by the reduced diameter end of the full body injection nozzle.

While eliminating the impression left by the full body construction, the needle protrudes a significant distance from the main body into the sprue cavity immediately adjacent an injection port.

The exposed position of the end of the needle prevents good heat transfer from being established from the heater coil into the needle and into the mold material. Thus a high temperature and good fluidity of the injected material is not able to be maintained, resulting in difficulties in practicing injection molding using such bodyless design.

Another difficulty is encountered in conventional injection molding nozzles. The mold cavities are defined by mold plates of varying standard thicknesses. The mold plate surface is utilized to locate the injection molding tip within a bore leading into the mold cavity. This is conventionally done by a large diameter rear portion of the injection nozzle main body positioned against the outer surface of the mold plate. This necessitates stocking a relatively large number of differing injection nozzles configurations adapted to a particular mold plate thickness. It would be advantageous if such need for a number of varying injection nozzle configurations could be eliminated.

Accordingly, it is an object of the present invention to provide an injection molding nozzle and method allowing a "bodyless" configuration, eliminating the impression created by a full body construction, while maintaining good heat transfer from the nozzle heater coil into the injected material at the point of injection into the mold cavity.

It is a further object of the present invention to provide such as injection nozzle and method for allowing the use of a standardized configuration adaptable to various mold plate thicknesses.

SUMMARY OF THE PRESENT INVENTION

These and other objects of the present invention which will become apparent upon reading the following specifications and claims are achieved by providing an injection nozzle having a tip insert extending forwardly of the main body member of the injection nozzle, the tip insert having a central passage aligned with the central passage of the main body of the injection nozzle receiving the injection mold material. A heating needle is disposed extending within each of the central passages and extending slightly beyond the end of the tip insert.

The mold cavity plate is formed with a bore defining a sprue cavity, which bore is adapted to receive a reduced diameter end portion of the tip insert. The mold plate bore converges into an injection port opening into the mold cavity. In use, the tip insert reduced diameter end is positioned in the mold plate bore, with the needle end protruding slightly into the sprue cavity and the injection port, lying but a relatively slight distance beyond the end of the tip insert. This arrangement allows an effective heat conductive path from the heater coil surrounding the main body of the injection nozzle into the tip insert and heating needle such that good heat transfer into the injected material at the injection port and sprue cavity is able to be achieved.

In the method, material is injected through the tip insert passage and into the sprue cavity while energizing the heater coil, and thence through the injection port into the mold cavity.

An arrangement and method is also provided for utilizing a single injection nozzle configuration adapted to be fit to mold cavity plates of varying thickness. This is achieved by providing a stepped diameter heater cover mounted over the heater coil surrounding a reduced diameter section of the injection nozzle main body. This creates a shoulder located adjacent the tip insert and by machining the shoulder, the nozzle tip may be located axially at a predetermined position upon being fit into a mold plate of any predetermined thickness.

Accordingly, a single nozzle configuration can be adapted to many different plate thicknesses by merely machining the shoulder correspondingly to a particular mold plate thickness.

DETAILED DESCRIPTION

In the following detailed description certain specific terminology will be employed for the sake of clarity and a particular embodiment describes in accordance with the requirements of 35 USC 112, but it is to be understood that the same is not intended to be limiting and indeed should not be so construed inasmuch as the invention is capable of taking many forms and variations within the scope of the appended claims.

Figure 1:
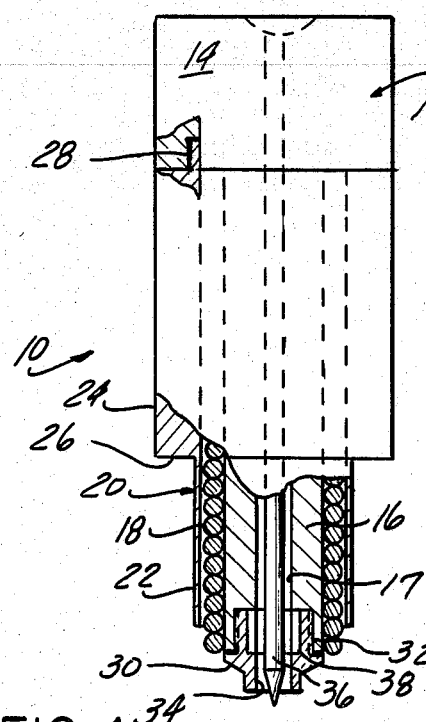
FIG. 1 is a partially sectional elevational view of an injection molding nozzle according to the present invention.

Referring to the drawings, and particularly FIG. 1 an injection nozzle 10 according to the present invention is shown in partial section. The injection nozzle 10 includes a generally cylindrical main body 12 consisting of a relatively larger diameter end portion 14 and an elongated smaller diameter portion 16 extending axially therefrom. A central passage 17 extends through the length of the main body 12 as is adapted to receive the material to be molded injected therethrough from an injection molding press in the manner well known to those skilled in the art.

Surrounding the smaller diameter portion 16 of the main body 12 is a heater coil 18, which extends forwardly to the end of the main body portion as shown in FIG. 1. Enclosing the heater coil 18 is a heater cover 20 having a forward portion 22 of relatively thin wall construction and a stepped diameter portion 24 forming a shoulder 26 for purposes as will be hereinafter described. The cover 20 is threaded at 28 into the larger diameter end portion 14 of the main body 12 to be mounted thereto.

Extending from the end of the reduced diameter portion 16 of the main body 12 is a tip insert 30 mounted thereto by being received into the end and threadably engaged at 32, such as to extend away from the end of the reduced diameter portion 16. The tip insert 30 also has a central passage 34 of the same diameter and aligned with the central passage 17 of the main body 12. Mounted within each of the central passages is a heating needle 36 supported by a hub member 38 received in a counterbore in tip insert 30.

Figure 2:
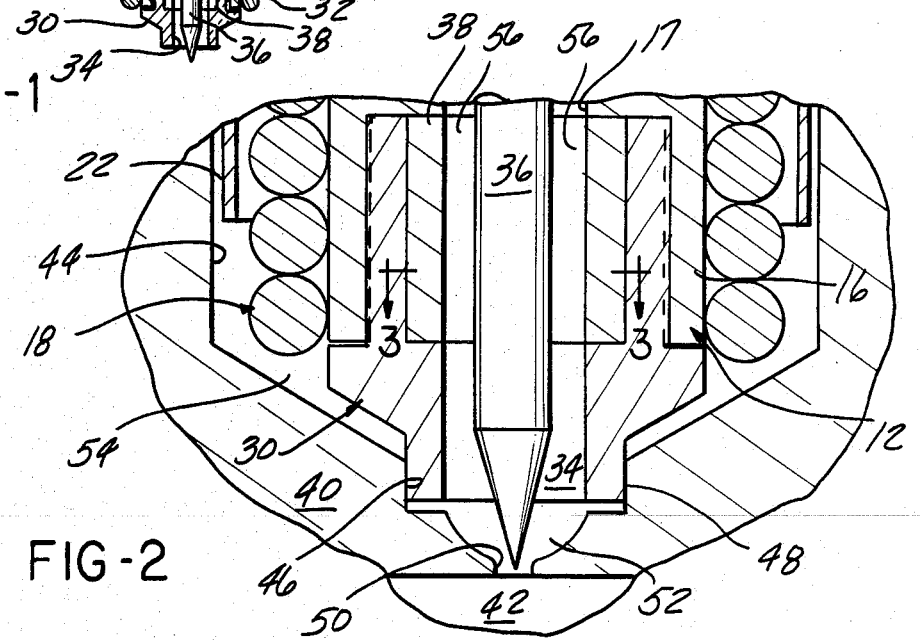
FIG. 2 is an enlarged partially sectional view of the injection nozzle shown in FIG. 1, in position within a bore formed in a mold plate, showing adjacent portions of the mold.

Referring to FIG. 2, the detailed construction of the tip insert and relationship to a mold plate 40 is depicted. The mold plate 40 defines in part a mold cavity 42 which is adapted to receive the injected material and form a molded part in the manner well known to those skilled in the art. The mold plate 40 includes a bore 44 adapted to receive the injection nozzle main portion 12 forward of the shoulder 26 with a clearance space therebetween.

Formed into a bore 44 is a reduced diameter bore 46 which is slidably interfit with a reduced diameter end portion 48 of the tip insert 30. The reduced diameter bore 46 converges to form an injection port 50 and a small volume sprue cavity 52 immediately adjacent thereto. The needle 36 protrudes slightly out of the central passage 34 and into the small volume sprue cavity 52 and injection port 50. The tip insert 30 itself extends into a bore 44 formed in the mold plate 54 into which the tip insert 30 extends forward of the injection nozzle main body 12.

Mold material is injected through the central passages 17 and 34 while the heater coil is energized to maintain the material at a high temperature.

Figure 3:
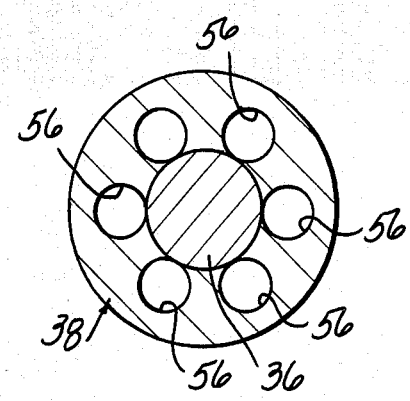
FIG. 3 is a view of the section 3—3 taken in FIG. 2.

A plurality of flow openings 56 are provided in the needle support hub 38 as best seen in FIG. 3. The solid areas of the hub 38 intermediate openings 56 allow for heat transfer into the needle 36. Molten material passes into the sprue cavity 36 and thence through the injection port 50 into the mold cavity 42, and thus there is provided a bodyless type injection nozzle, i.e. no portion of the main body of the nozzle 10 comes into contact with the mold cavity to eliminate the imprint of the injection nozzle on the finished part.

However, the tip insert 30 is substantially coextensive with the needle 36 which must protrude only slightly in passing through the small volume sprue cavity 52 and injection port 50. Thus, a good conductive heat transfer path is maintained from the main body portion 16 into the tip insert 30 and the needle 36.

Accordingly, a high temperature is maintained in the injected molten material to insure good liquidity and injection molding performance.

Figure 4:
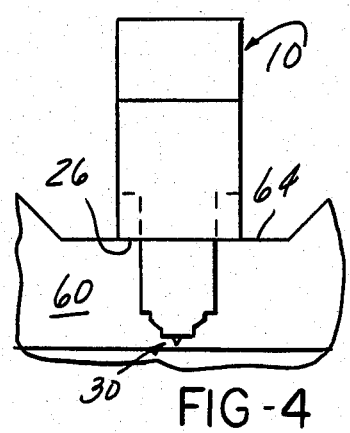
FIGS. 4 and 5 are diagrammatic representations of the injection nozzle shown in FIG. 1, modified to accomodate varying mold plate thicknesses.
Figure 5:
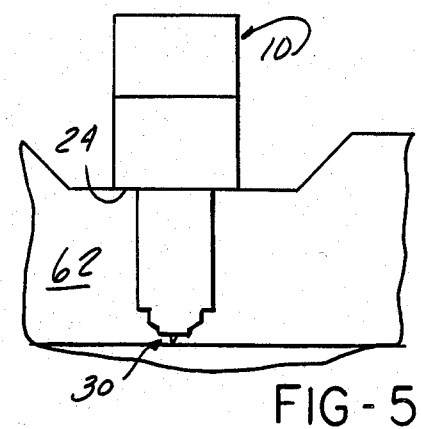

Referring to FIGS. 4 and 5, the function of the shoulder 26 on the heater cover 20 can be appreciated. In FIG. 4, a mold plate 60 of one thickness is depicted and in FIG. 5, a mold plate 62 a heavier thickness. In FIG. 4, the injection nozzle 10 is mounted on the mold plate 60 with the shoulder 26 abutting the upper surface 64 of the mold plate 60, to properly locate the tip 30 of the nozzle 10 with respect to the mold. If fitting the same injection nozzle 10 to a mold having a much thicker injection mold plate 62 is required, the large diameter portion 24, need only be machined as by turning to remove material as indicated in phantom in FIG. 4. This shifts the shoulder 24 correspondingly to enable mounting the injection nozzle 10 to appropriately locate the tip 30 in the mold.

Accordingly, it can be appreciated that the above recited objects of the present invention have been achieved by the injection nozzle and method described. It should also be appreciated that many variations are of course possible within the scope of the appended claims.

I claim:

1. An injection nozzle for injection molding comprising:

a main body, comprised of an elongated member having a central passage formed therein adapted to receive material to be injected into a mold cavity;
 a heater coil surrounding a portion of said main body, disposed along the length of said main body and exending to one thereof;
 a heater cover mounted over said heater coil;
 a tip insert having a portion received into said one end of said main body and a portion projecting axially therefrom, said tip insert having a central passage aligned with said central passage of said main body to receive flow of material to be injected; said tip projecting portion including a reduced diameter end portion, with said central passage extending therethrough;
 said tip insert being formed with a counterbore formed in said portion received in said one end of said main body;
 a hub member seated in said counterbore concentric with said central passages in said main body and tip insert;
 a heater needle mounted to said hub member to extend within said central passages of said main body and tip respectively, and slightly protruding out of said tip reduced end portion, said hub member formed with a plurality of flow openings with intermediate solid areas, enabling flow of material between said central passages;

said needle being heated by heat transfer from said heater coil through said main body one end, said tip portion received therein, and said hub member, whereby said material flowing past said needle is thereby heated.

2. The injection nozzle according to claim 1 wherein said central passage in said tip is a straight bore opening out of said reduced diameter end portion.

3. The injection nozzle according to claim 1 wherein said main body comprises a large diameter end portion and a small diameter trunk portion surrounded by said heater coil, and wherein said heater cover comprises a generally cylindrical member threaded at one end into said larger diameter portion of said main body, and including an intermediate portion of greater diameter than said threaded end, said intermediate portion abutting said larger diameter portion of said main body, said other end of said heater cover of smaller diameter than said intermediate portion to form a shoulder enabling axial location of said nozzle in a mold plate.

4. A method of injecting material into a mold cavity defined by a surrounding mold through a heated injection nozzle having a main body formed with a central passage, comprising the steps of:

forming a mold wall with a bore extending thereinto and converging to a small diameter injection port opening into said mold cavity;

positioning a tip insert having a portion received in and mounted to an end of said main body in said bore, said tip having a reduced diameter end portion projecting from said end of said main body, with a central passage aligned with said main body central passage and also aligned with said injection port with said tip insert positioned in said bore;

locating a needle in said central passage extending into said injection port by mounting a hub member separate from said tip insert in a counterbore in said tip insert portion received within said end of said main body;

positioning a heater coil surrounding said injection nozzle main body and extending to a point adjacent to said tip insert;

injecting material through said central passages and through said injection port while energizing said heater coil, whereby said needle is heated to heat material at said injection port, by conduction from said heater coil through said main body, said tip portion received therein, and said hub member.

* * * * *